United States Patent
Henry

(10) Patent No.: US 10,362,242 B2
(45) Date of Patent: Jul. 23, 2019

(54) SELECTIVE COLOR DISPLAY OF A THERMAL IMAGE

(71) Applicant: Seek Thermal, Inc., Santa Barbara, CA (US)

(72) Inventor: Blake Henry, Santa Barbara, CA (US)

(73) Assignee: Seek Thermal, Inc., Goleta, CA (US)

( * ) Notice: Subject to any disclaimer, the term of this patent is extended or adjusted under 35 U.S.C. 154(b) by 721 days.

(21) Appl. No.: 14/851,576

(22) Filed: Sep. 11, 2015

(65) Prior Publication Data
US 2016/0080664 A1    Mar. 17, 2016

Related U.S. Application Data

(60) Provisional application No. 62/049,880, filed on Sep. 12, 2014.

(51) Int. Cl.
| | |
|---|---|
| H04N 5/33 | (2006.01) |
| H04N 5/232 | (2006.01) |
| H04N 9/04 | (2006.01) |
| H04N 9/64 | (2006.01) |
| G01J 5/02 | (2006.01) |

(52) U.S. Cl.
CPC ........... *H04N 5/33* (2013.01); *H04N 5/23293* (2013.01); *H04N 9/04* (2013.01); *H04N 9/64* (2013.01); *G01J 5/025* (2013.01)

(58) Field of Classification Search
CPC ........ H04N 5/33; H04N 9/04; H04N 5/23293; H04N 9/64
See application file for complete search history.

(56) References Cited

U.S. PATENT DOCUMENTS

| | | |
|---|---|---|
| 4,967,082 A | 10/1990 | Cooke et al. |
| 7,544,944 B2 | 6/2009 | Strandemar |
| 7,683,321 B1 | 3/2010 | King et al. |
| 7,693,679 B1 | 4/2010 | Warnke et al. |
| 8,340,414 B2 | 12/2012 | Hogasten et al. |
| 8,354,639 B2 | 1/2013 | Jönsson et al. |
| 8,386,951 B2 | 2/2013 | Tallman |
| 8,599,262 B2 | 12/2013 | George-Svahn et al. |
| 9,279,728 B2 | 3/2016 | Roth et al. |
| 9,367,219 B2 | 6/2016 | Andersson |
| 2002/0074499 A1 | 6/2002 | Butler |
| 2003/0137318 A1* | 7/2003 | Enachescu ........... G01R 31/308 324/760.01 |
| 2010/0220193 A1 | 9/2010 | Högasten et al. |
| 2012/0249800 A1 | 10/2012 | George-Svahn et al. |
| 2012/0312976 A1 | 12/2012 | Boulanger et al. |

(Continued)

*Primary Examiner* — Shawn S An
(74) *Attorney, Agent, or Firm* — Knobbe, Martens, Olson & Bear, LLP

(57) ABSTRACT

An imaging system includes an array of photodetectors that produce an array of intensity values. Image and display processing components of the imaging system produce an array of display-formatted pixels for display on an imaging system display. The display-formatted pixels include a first plurality of pixels associated with a color lookup table and a second plurality of pixels associated with a grey-scale lookup table. The image and display processing components compare pixel intensity values to temperature criteria and apply the color lookup table to pixels satisfying the temperature criteria and apply the grey-scale lookup table to pixels not satisfying the temperature criteria.

20 Claims, 9 Drawing Sheets

(56) References Cited

U.S. PATENT DOCUMENTS

| | | |
|---|---|---|
| 2015/0009325 A1 | 1/2015 | Kardashov |
| 2015/0124102 A1 | 5/2015 | Frost et al. |
| 2015/0281601 A1 | 10/2015 | Ganapathi |
| 2015/0312488 A1 | 10/2015 | Kostrzewa et al. |
| 2016/0044306 A1* | 2/2016 | Chahine ............... H04N 5/2353 348/164 |
| 2016/0057369 A1* | 2/2016 | Wolfe ..................... H04N 5/33 348/322 |
| 2018/0283953 A1 | 10/2018 | Frank et al. |

* cited by examiner

SELECTIVE COLOR DISPLAY OF A THERMAL IMAGE

CROSS-REFERENCE TO RELATED APPLICATIONS

This application claims the benefit of priority from U.S. Prov. App'n No. 62/049,880, filed Sep. 12, 2014, entitled "Selective Color Display of a Thermal Image," which is incorporated by reference herein in its entirety.

BACKGROUND

Field

The present disclosure generally relates to color display of a thermal image, and in particular to using different display lookup tables depending on temperatures in a scene.

Description of Related Art

The increasing availability of high-performance, low-cost uncooled infrared imaging devices, such as bolometer focal plane arrays (FPAs), is enabling the design and production of mass-produced, consumer-oriented infrared (IR) cameras capable of quality thermal imaging. Such thermal imaging sensors have long been expensive and difficult to produce, thus limiting the employment of high-performance, long-wave imaging to high-value instruments, such as aerospace, military, or large-scale commercial applications. Mass-produced IR cameras may have different design requirements than complex military or industrial systems. New approaches to provide effective thermal image display with limited camera resources may be beneficial.

SUMMARY

Example embodiments described herein have innovative features, no single one of which is indispensable or solely responsible for their desirable attributes. Without limiting the scope of the claims, some of the advantageous features will now be summarized.

An imaging system includes an array of photodetectors configured to produce an array of intensity values corresponding to light intensity at the photodetectors. The imaging system can include a display for display images acquired with the array of photodetectors, after some image and display processing. The image and display processing components of the imaging system produce an array of display-formatted pixels for display on the imaging system display. The display-formatted pixels include a first plurality of pixels formatted for display using a first lookup table and a second plurality of pixels formatted for display using a second lookup table. The first lookup table can be a color lookup table and the second lookup table can be a grey scale lookup table, for example and without limitation. To determine which lookup table to use, the image and display processing components compare pixel values to temperature criteria and format pixels using the first lookup table for pixels satisfying the temperature criteria and format pixels using the second lookup table for pixels not satisfying the temperature criteria. The temperature criteria can be defined by a user of the imaging system, for example and without limitation. The imaging system can be a thermal imaging system and may include an infrared camera core.

In a first aspect, a method is provided for displaying a thermal image using a thermal imaging system having an array of photodetectors configured to acquire thermal image data. The method includes acquiring thermal image data with the array of photodetectors, the thermal image data comprising an array of pixel intensity values. The method includes receiving temperature criteria, determining a scene temperature for individual pixel intensity values using a thermography function, and comparing individual pixels to the temperature criteria. The method also includes formatting for display individual pixel values. The method also includes applying a first lookup table to an individual display-formatted pixel if the pixel value satisfies the temperature criteria and applying a second lookup table to the individual display-formatted pixel if the pixel value does not satisfy the temperature criteria. The method also includes displaying a thermal image on a display of the thermal imaging system, the thermal image comprising the display-formatted individual pixel values with the applied lookup tables.

In some embodiments of the first aspect, the method further includes converting the temperature criteria to intensity-based criteria using a thermography function. In a further embodiment, comparing individual pixels to the temperature criteria includes comparing individual pixel intensity values to the intensity-based criteria. In some embodiments of the first aspect, comparing individual pixels to the temperature criteria includes comparing individual pixel temperature values to the temperature criteria. In some embodiments of the first aspect, the first lookup table is configured to output a color value and the second lookup table is configured to output a grey-scale value, and wherein at least a portion of the thermal image is displayed using color and another portion of the thermal image is displayed using a grey scale.

In some embodiments of the first aspect, the temperature criteria comprises at least one of a minimum temperature threshold that is satisfied if an individual pixel intensity value corresponds to a temperature that is greater than or equal to the minimum temperature threshold; a maximum temperature threshold that is satisfied if an individual pixel intensity value corresponds to a temperature that is less than or equal to the maximum temperature threshold; a targeted temperature value that is satisfied if an individual pixel intensity value corresponds to a temperature that is substantially the same as the targeted temperature value; and a targeted temperature range that is satisfied if an individual pixel intensity value corresponds to a temperature that is within the targeted temperature range.

In some embodiments of the first aspect, receiving the temperature criteria includes determining the temperature criteria based on user interaction with the thermal imaging system. In some embodiments of the first aspect, the temperature criteria includes a plurality of conditions. In a further embodiment, the method further includes applying a first color lookup table if the individual pixel value satisfies a first condition of the temperature criteria, applying a second color lookup table if the individual pixel value satisfies a second condition of the temperature criteria, and applying a grey-scale lookup table if the individual pixel value does not satisfy any of the plurality of conditions.

In some embodiments of the first aspect, the method further includes displaying at least one scene temperature overlaid on the thermal image. In some embodiments of the first aspect, the method further includes performing signal processing on the thermal image data, the signal processing including performing a histogram equalization method on the pixel intensity values prior to applying the first or second lookup tables. In some embodiments of the first aspect, the method further includes displaying a user interface with which a user may interact to set the temperature criteria.

In a second aspect, a thermal imaging system is provided that includes an imaging array comprising an infrared focal plane array, the infrared focal plane array configured to generate signals corresponding to levels of infrared light incident on the infrared focal plane array. The thermal imaging system includes a detector circuit comprising readout electronics that receive the generated signals and output an array of pixel intensity values. The thermal imaging system includes a system controller configured to receive temperature criteria, determine a scene temperature for individual pixel intensity values using a thermography function, and compare individual pixels to the temperature criteria. The system controller is further configured to format for display individual pixel intensity values. The system controller is further configured to apply a first lookup table to an individual display-formatted pixel if the individual pixel intensity value satisfies the intensity-based criteria and apply a second lookup table to the individual display-formatted pixel if the individual pixel intensity value does not satisfy the intensity-based criteria. The thermal imaging system includes a display configured to display a thermal image comprising an array of the display-formatted pixels with the applied lookup tables.

In some embodiments of the second aspect, the system controller is further configured to convert the temperature criteria to intensity-based criteria using the thermography function. In a further embodiment, the system controller is configured to compare individual pixels to the temperature criteria by comparing individual pixel intensity values to the intensity-based criteria.

In some embodiments of the second aspect, the first lookup table comprises a color lookup table and the second lookup table comprises a grey-scale lookup table such that the thermal image comprises at least a first plurality of pixels displayed using color and a second plurality of pixels displayed using grey scale. In some embodiments of the second aspect, the display comprises a touchscreen interface and the temperature criteria is received through user interaction with the touchscreen interface.

In some embodiments of the second aspect, the thermal imaging system includes a thermal camera comprising a thermal camera housing and a connector wherein the imaging array and the detector circuit are within the thermal camera housing, and a personal electronics device comprising the system controller and the display, wherein the connector of the thermal camera is configured to mechanically and electrically couple to the personal electronics device to transmit the thermal image data from the thermal camera to the personal electronics device. In a further embodiment, control of the thermal camera is provided through interaction with the personal electronics device.

In some embodiments of the second aspect, the temperature criteria comprises at least one of a minimum temperature threshold that is satisfied if an individual pixel intensity value corresponds to a temperature that is greater than or equal to the minimum temperature threshold; a maximum temperature threshold that is satisfied if an individual pixel intensity value corresponds to a temperature that is less than or equal to the maximum temperature threshold; a targeted temperature value that is satisfied if an individual pixel intensity value corresponds to a temperature that is substantially the same as the targeted temperature value; and a targeted temperature range that is satisfied if an individual pixel intensity value corresponds to a temperature that is within the targeted temperature range.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
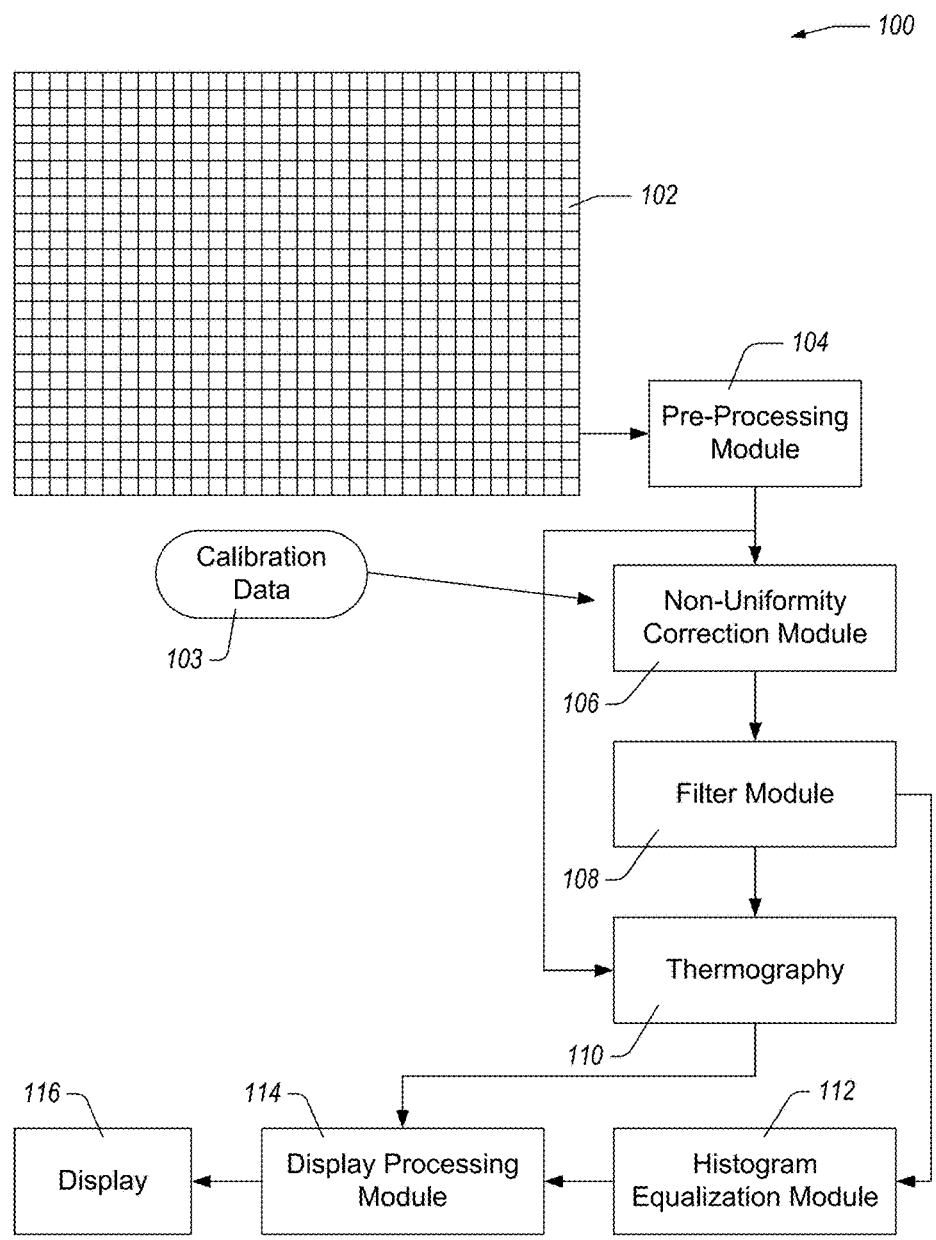
FIG. 1A illustrates a functional block diagram of an example imaging system.

Generally described, aspects of the present disclosure relate to selective color display of a thermal image on a thermal imaging system. The selective color display can be configured to depend at least in part on pixel intensity values and how those intensity values translate into scene temperature. Pixels satisfying a temperature criteria can be displayed using colors and pixels not satisfying the temperature criteria can be displayed using a grey scale. The present disclosure includes systems and methods to format pixels for display using one or more lookup tables to translate pixel intensity values to pixel display values. To determine these pixel display values, the systems and methods disclosed herein compare the pixel intensity values to temperature criteria, select a lookup table based on satisfaction or non-satisfaction of the temperature criteria, and retrieve a pixel display value corresponding to the pixel intensity value from the selected lookup table. These pixels can then be displayed on the thermal imaging system. Thus, in some embodiments, these systems and methods can selectively display portions of an image using a range of colors and other portions of the image using grey scale. Advantageously, this can allow a user to quickly determine which portions of an image satisfy the criteria. Moreover, this can allow the thermal imaging system to efficiently process and format pixels for display using a plurality of lookup tables for the display formatting.

Although examples and implementations described herein focus, for the purpose of illustration, on implementation in an infrared camera and for thermal images, the systems and methods disclosed herein can be implemented in digital and/or video cameras that acquire visible light using a variety of image sensors. Various aspects of the disclosure will now be described with regard to certain examples and embodiments, which are intended to illustrate but not limit the disclosure.

Thermal imaging and display systems can be configured to receive or to determine a temperature value of interest (e.g., such as from a user of the system). When a thermal image of a scene is displayed, the various temperatures of the scene may be displayed by formatting pixel values using different lookup tables depending on the relationship of pixel intensity values to the temperature value of interest. In some embodiments, temperatures in a scene satisfying a tailored criteria (e.g., temperatures within a tailored range, above a threshold, below a threshold, equal to a temperature value, etc.) may be displayed using a color lookup table, and the other temperatures in the scene may be displayed using a grey-scale lookup table.

Thermal imaging systems may implement a method for displaying thermal images that selectively colorize portions of the thermal image based on satisfaction of temperature criteria. The method can include acquiring image data of a scene from a thermal imaging sensor comprising an array of photodetectors (e.g., pixels), wherein the image data corresponds to the intensity of radiation detected by the pixels of the imaging sensor. The method can then be configured to determine the relation between detected intensity and scene temperature with a thermography function. The method can be configured to perform signal processing on the image data, which may include formatting the image data for presentation on a visual display. The method can receive or determine a temperature value of interest (e.g., such as from a user) and can convert the temperature value of interest to a corresponding intensity value of interest with the thermography function. The method can compare pixel intensity values for individual pixels to the intensity value of interest. The method can select a display lookup table from a plurality of available lookup tables based at least in part on the relationship between the pixel intensity and the intensity value of interest and format for display the pixel data with the selected lookup table for each pixel displayed. In some embodiments, at least one of the selected lookup tables can be a color lookup table and at least one other selected lookup table can be a grey-scale lookup table.

Some embodiments described herein advantageously improve the presentation of thermal images by increasing the amount of visual information available in the displayed image by selectively colorizing at least a portion of the thermal image based on satisfaction of temperature criteria. A user can thus quickly ascertain which portions of a thermal image satisfy the temperature criteria by identifying which portions are displayed in color.

Some embodiments described herein advantageously provide for display of a thermal image with regions of interest highlighted for display. The user can provide temperature criteria to a thermal imaging system and regions of the thermal image that satisfy the temperature criteria can be highlighted (e.g., by using colors rather than grey scale).

Some embodiments described herein advantageously provide an efficient way to improve the user experience on a mass-produced thermal imaging camera. Through the use of a plurality of lookup tables and user-input temperature criteria, the thermal imaging camera can efficiently determine and colorize portions of a thermal image to provide a visual indication of satisfaction of the user-input criteria. This feature may enhance the user experience by providing a visually distinctive indication of regions of interest to the user.

The disclosed systems and methods for displaying a thermal image may be implemented as modules that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer-executable instructions may be implemented along with discrete circuit components to carry out one or more of the methods described herein. In certain implementations, the disclosed methods may be implemented in conjunction with a focal plane array (FPA) on a camera core, wherein the processor and memory components executing the disclosed methods may be on a device mated to the camera core, such as a mobile appliance including smart phones, tablets, personal computers, etc. In some implementations, the processing and memory elements of the imaging system may be in programmable logic or on-board processors that are part of the core or camera system. In some embodiments, image gain calibration may be accomplished on a processing element on the camera core, and further image processing and display may be accomplished by a system controller mated to the core.

As a particular example of some advantages provided by the disclosed systems and methods, an imaging system can include a focal plane array (FPA) configured to acquire images of a scene. The FPA can include a two-dimensional array of N detectors, the FPA configured to output a two-dimensional image of the scene. For imaging purposes, image frames, typically data from all or some of the detectors $N_f$, are produced by the FPA, each successive frame containing data from the array captured in successive time windows. Thus, a frame of data delivered by the FPA comprises $N_f$ digital words, each word representing a particular pixel, P, in the image. These digital words are usually of a length determined by the analog to digital conversion (A/D) process. For example, if the pixel data is converted with a 14 bit A/D, the pixel words may be 14 bits in length, and there may be 16384 counts per word. For an IR camera used as a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. It may be desirable to display this data on a visual display.

Example Imaging Systems

FIG. 1A illustrates a functional block diagram of an imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a read out integrated circuit ("ROIC"). The array of microbolometers can be configured to generate electrical signals in response to a quantity of thermal radiation or a temperature. The ROIC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g., calibration data 103) that can be used during image processing to generate a superior image. For example, calibration data 103 may include bad pixel maps and/or gain tables stored in data storage and retrieved by modules in the imaging system 100 to correct and/or adjust the pixel values provided by the focal plane array 102. Calibration data 103 may include gain tables. As described herein, the focal plane array 102 can include a plurality of pixels with integrated read out electronics. The read out electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are described in greater detail in U.S. patent application Ser. No. 14/829,490, entitled "Gain Calibration for an Imaging System," filed Aug. 18, 2015, the entire contents of which is incorporated by reference herein. The calibration data 103 can be stored on the imaging system 100 or in data storage on another system for retrieval during image processing.

The imaging system 100 includes one or more modules configured to process image data from the focal plane array 102. One or more of the modules of the imaging system 100 can be eliminated without departing from the scope of the disclosed embodiments. The following modules are described to illustrate the breadth of functionality available to the disclosed imaging systems and not to indicate that any individual module or described functionality is required, critical, essential, or necessary.

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter ("RDAC") functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are described in greater detail in U.S. patent application Ser. No. 14/829,500, filed Aug. 18, 2015, entitled "Adaptive Adjustment of the Operating Bias of an Imaging System," the entire contents of which is incorporated by reference herein.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived by intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter. Additional examples of systems and methods for non-uniformity correction are described in U.S. patent application Ser. No. 14/817,847, entitled "Time Based Offset Correction for Imaging Systems," filed Aug. 4, 2015, the entire contents of which is incorporated by reference herein.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the read out integrated circuit of the focal plane array can introduce artifacts into an image, such as variations between rows and/or columns. The filter module 108 can be configured to correct for these row- or column-based artifacts, as described in greater detail in U.S. patent application Ser. No. 14/702,548, entitled "Compact Row Column Noise Filter for an Imaging System," filed May 1, 2015, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. Prov. Pat. App'n No. 62/086,305, entitled "Image Adjustment Based on Locally Flat Scenes," filed Dec. 2, 2014, the entire contents of which is incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace pixel data with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. patent application Ser. No. 14/817,989, entitled "Local Contrast Adjustment for Digital Images," filed Aug. 4, 2015, the entire contents of which is incorporated by reference herein.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. patent application Ser. No. 14/838,000, entitled "Thermography for a Thermal Imaging Camera," filed Aug. 27, 2015, the entire contents of which is incorporated by reference herein.

The image processing system 100 includes a histogram equalization module 112, or other display conversion module, configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on portions of the image where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words. For instance, the sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described herein with reference to FIGS. 2A-6.

The display 116 can be configured display the processed image data. The display 116 can also be configured to accept input to interact with the image data and/or to control the imaging system 100. For example, the display 116 can be a touchscreen display.

The imaging system 100 can be provided as a standalone device, such as a thermal sensor. For example, the imaging system 100 can include an imaging system housing configured to enclose hardware components (e.g., the focal plane array 102, read out electronics, microprocessors, data storage, field programmable gate arrays and other electronic components, and the like) of the imaging system 100. The imaging system housing can be configured to support optics configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like.

In some embodiments, the imaging system 100 can be part of a network of a plurality of imaging systems. In such embodiments, the imaging systems can be networked together to one or more controllers.

Figure 1B:
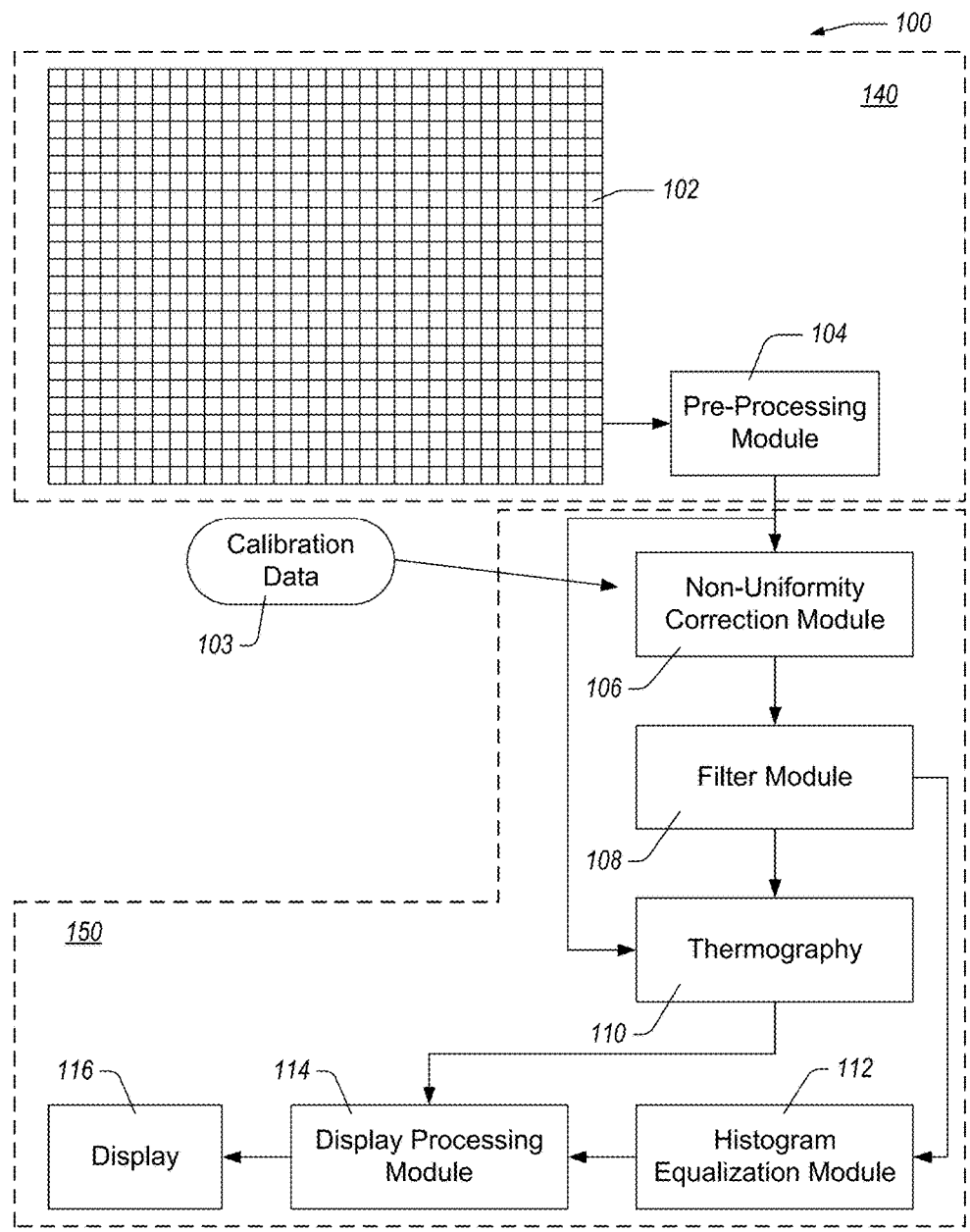
FIG. 1B illustrates a functional block diagram of the example imaging system illustrated in FIG. 1A, wherein functionality of the imaging system is divided between a camera and a mobile electronic device.

FIG. 1B illustrates a functional block diagram of the example imaging system 100 illustrated in FIG. 1A, wherein functionality of the imaging system 100 is divided between a camera or sensor 140 and a mobile electronic device 150. By dividing image acquisition, pre-processing, signal processing, and display functions among different systems or devices, the camera 140 can be configured to be relatively low-power, relatively compact, and relatively computationally efficient compared to an imaging system that performs a majority or all of such functions on board. As illustrated in FIG. 1B, the camera 140 is configured to include the focal plane array 102 and the pre-processing module 104. In some embodiments, one or more of the modules illustrated as being part of the mobile electronic device 150 can be included in the camera 140 instead of in the mobile electronic device 150. In some embodiments, certain advantages are realized based at least in part on the division of functions between the camera 140 and the mobile electronic device 150. For example, some pre-processing functions can be implemented efficiently on the camera 140 using a combination of specialized hardware (e.g., field-programmable gate arrays, application-specific integrated circuits, etc.) and software that may otherwise be more computationally expensive or labor intensive to implement on the mobile electronic device 150. Accordingly, an aspect of at least some of the embodiments disclosed herein includes the realization that certain advantages may be achieved by selecting which functions are to be performed on the camera 140 (e.g., in the pre-processing module 104) and which functions are to be performed on the mobile electronic device 150 (e.g., in the thermography module 110).

An output of the camera 140 can be a stream of digital data representing pixel values provided by the pre-processing module 104. The data can be transmitted to the mobile electronic device 150 using electronic connectors (e.g., a micro-USB connector, proprietary connector, etc.), cables (e.g., USB cables, Ethernet cables, coaxial cables, etc.), and/or wirelessly (e.g., using BLUETOOTH, Near-Field Communication, Wi-Fi, etc.). The mobile electronic device 150 can be a smartphone, tablet, laptop, or other similar portable electronic device. In some embodiments, power is delivered to the camera 140 from the mobile electronic device 150 through the electrical connectors and/or cables.

The imaging system 100 can be configured to leverage the computing power, data storage, and/or battery power of the mobile electronic device 150 to provide image processing capabilities, power, image storage, and the like for the camera 140. By off-loading these functions from the camera 140 to the mobile electronic device 150, the camera can have a cost-effective design. For example, the camera 140 can be configured to consume relatively little electronic power (e.g., reducing costs associated with providing power), relatively little computational power (e.g., reducing costs associated with providing powerful processors), and/or relatively little data storage (e.g., reducing costs associated with providing digital storage on the camera 140). This can reduce costs associated with manufacturing the camera 140 due at least in part to the camera 140 being configured to provide relatively little computational power, data storage, and/or power, because the imaging system 100 leverages the superior capabilities of the mobile electronic device 150 to perform image processing, data storage, and the like.

Example Thermal Imaging System for a Personal Electronics Device

Figure 2B:
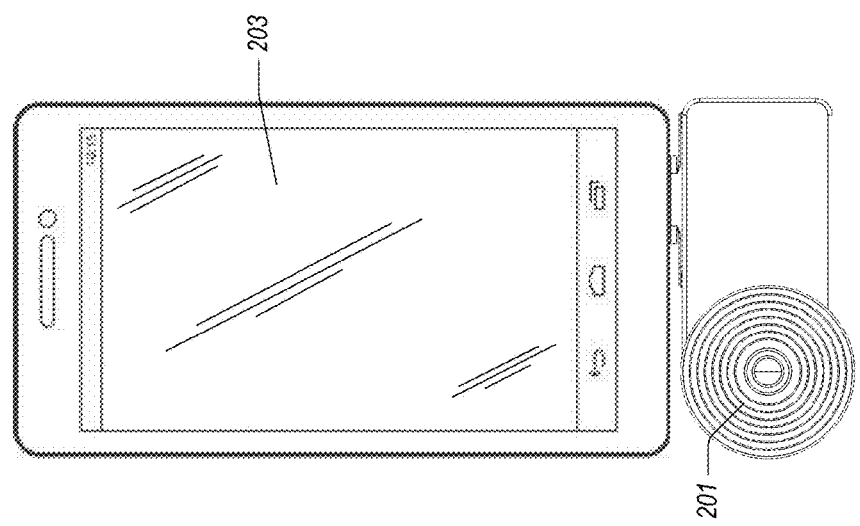
FIGS. 2A and 2B illustrate an example thermal imaging camera and the example thermal imaging camera interfaced to a personal electronics device.
Figure 2A:
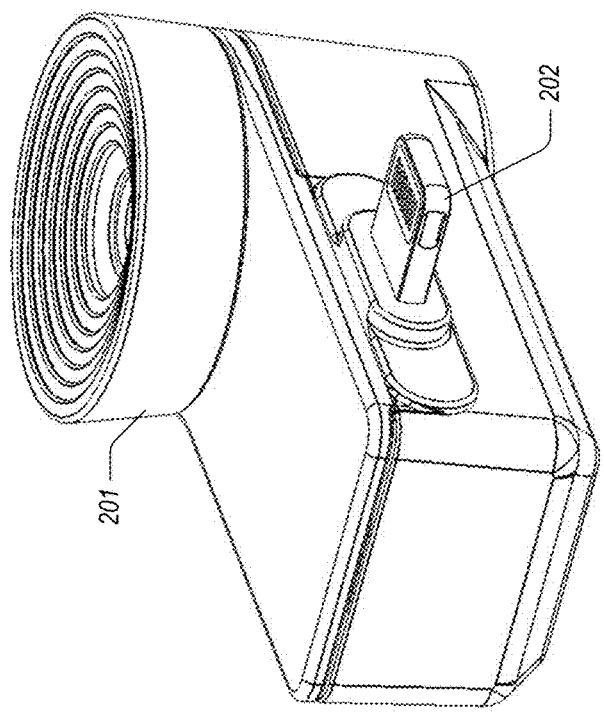

FIGS. 2A and 2B illustrate an example thermal camera 201 configured to be coupled to a personal electronics device 203. The thermal camera 201 can include components configured to acquire thermal image data and can be configured to transmit this thermal image data to the personal electronics device 203 via a connector 202. The personal electronics device 203 can further process the image data from the thermal camera 201 to apply filters to the image data, provide thermography functions, display thermal image data, and the like. As described herein with reference to FIG. 1B, the personal electronics device 203 can be configured to complement, supplement, augment, and/or complete the imaging capabilities of the thermal camera 201. The personal electronic device 203, for example, can be used to control and to provide user input used by the thermal camera 201. For example, to acquire a thermal image, an application can run on the personal electronics device 203 and a user interaction with the personal electronics device 203 (e.g., by touching or otherwise interacting with a touchscreen) can initiate the process of acquiring a thermal image with the thermal camera 201. The acquired image data can be processed by a combination of the thermal camera 201 and the personal electronics device 203 for display on the screen of the personal electronics device 203. In some embodiments, interaction with the thermal camera 201 occurs through an application running on the personal electronics device 203.

To provide greater information on the display of the personal electronics device 203, for example, a thermal image acquired with the thermal camera 201 can be displayed using a combination of colors and/or grey scale. To decide which pixels are to be displayed using a color scale and which pixels are to be displayed using grey scale, criteria can be analyzed. In some embodiments, the criteria can be determined based at least in part on interaction with the personal electronics device 203 (e.g., through user input acquired through interaction with a touchscreen). In some implementations, the criteria can be automatically determined. By displaying at least a portion of an imaged scene using a color scale and the rest of the imaged scene using a grey scale, the color portions of the image can be readily identified and information can be easily deduced from such a display. For example, a user viewing a scene that is partially displayed in color can easily identify which portions of the scene are in color and therefore the user can easily identify which portions of the scene meet the defined criteria. This can result in the user quickly and easily determining which portions of the scene being imaged meet designated temperature criteria, for example. Thus, the thermal camera 201 can be used to provide a quick and easy way to determine thermal properties of a scene using a display of a connected personal electronics device 203, wherein at least a portion of the scene is configured to be displayed using a first color scale (e.g., through the use of a color lookup table) and another portion of the scene is configured to be displayed using a second color scale or a grey scale.

In some embodiments, the thermal camera 201 can be of a variety of camera or imaging accessory for a personal electronics device 203 intended for mass-produced, personal use. It is to be understood, however, that the methods and systems described herein apply to other configurations including a thermal imaging system that is an independent device with its own processor and display, as well as intermediate configurations (e.g., a thermal imaging system with a detachable or secondary display).

Example System for Selective Color Display of a Thermal Image

Figure 3:
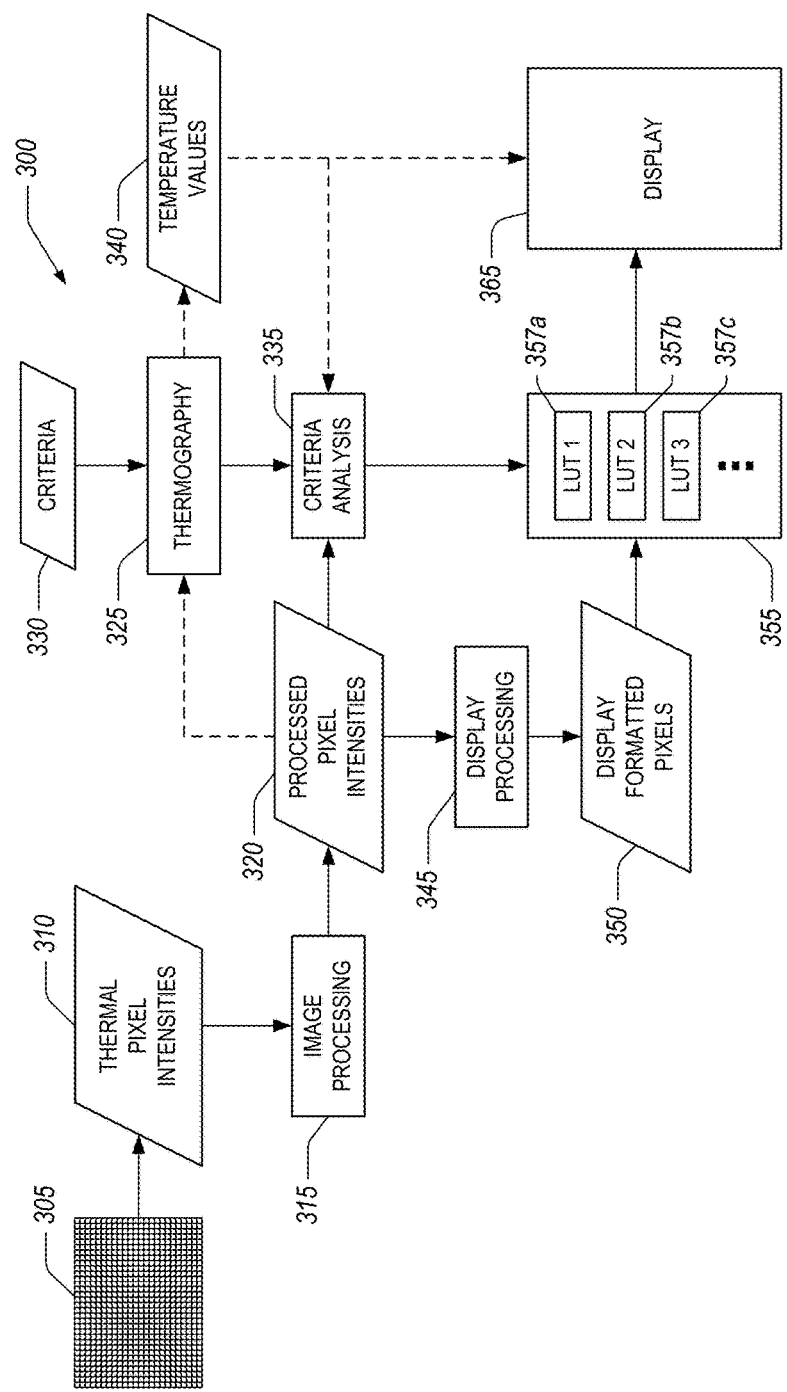
FIG. 3 illustrates a functional block diagram of a thermal imaging system configured to convert thermal image data acquired with a thermal image sensor to an array of display-formatted pixels, the display-formatted pixels being formatted using at least two different lookup tables depending on display formatting criteria.

FIG. 3 illustrates a functional block diagram of a thermal imaging system 300 configured to convert thermal image data acquired with a thermal image sensor 305 to an array of display-formatted pixels, wherein at least two different lookup tables are applied to the display-formatted pixels depending on defined or selected criteria. Thus, in certain implementations, a thermal imaging system can be configured to acquire thermal image data corresponding to an array of pixel intensity values and to display a thermal image wherein a color lookup table is applied to a first plurality of display-formatted pixels of the thermal image and a grey-scale lookup table is applied to a second plurality of display-formatted pixels of the thermal image, the first plurality of display-formatted pixels corresponding to pixels in the array of pixel intensity values whose intensity values satisfy a criteria based at least in part on scene temperature.

The thermal imaging system 300 can include a thermal image sensor 305 configured to acquire thermal image data 310. The thermal image sensor 305 can be a focal plane array, as described herein. The thermal image sensor 305 can be configured to thermally image scenes and to produce frames of thermal image data 310 of those scenes for display (and/or capture). The thermal image data 310 can comprise an array of pixel intensity values, wherein the intensity values correspond to temperatures within a scene being imaged.

The thermal imaging system 300 can include image processing electronics 315 configured to adjust the thermal image data 310 based on calibration values, filters, non-uniformity corrections, gain corrections, and the like. Examples of image processing functions and systems are described herein in greater detail with reference to FIGS. 1A and 1B. The image processing electronics 315 can output an array of processed pixel intensity values 320. In some embodiments, the thermal image sensor 305 includes readout electronics that output 14-bit digital words for each pixel so that the array of pixel intensity values 320 is an array of 14-bit digital words. The image processing electronics 315 can be configured to maintain the length of each digital word throughout image processing while adjusting the value of individual pixels.

The thermal imaging system 300 can include a thermography component 325 configured to convert between pixel intensity values and temperatures using a thermography function. The thermography component 325 is configured to correlate measured intensity per processed pixel to scene temperature through a series of calibration and computational steps. Similarly, the thermography component 325 is configured to correlate temperature values to measured intensity values. For example, the thermography component 325 can receive a temperature and convert that into an equivalent pixel intensity value. This can be useful, as described herein, to convert temperature-based criteria to intensity-based criteria. The intensity-based criteria can then be used to determine whether individual pixels satisfy the temperature-based criteria using intensity-based comparisons. Examples of thermography systems and methods are described in greater detail in U.S. patent. application Ser. No. 14/838,000, entitled "Thermography for a Thermal Imaging Camera," filed Aug. 27, 2015, the entire contents of which is incorporated by reference herein.

The thermography component 325 can be configured to receive criteria information 330 comprising one or more temperature conditions related to the display of thermal images. In some embodiments, the criteria information 330 is received from a user. For example, a user can interact with a display or other input device to define temperature criteria for display. In some embodiments, the criteria information 330 is determined automatically by the thermal imaging system 300. For example, the thermal imaging system 300 can be configured to determine criteria information to identify regions of interest in an image (e.g., by identifying outlier pixels based on a statistical analysis of this or preceding image frames). As another example, the thermal imaging system 300 or other system can be configured to determine criteria information based on pre-defined rules. In various implementations, these pre-defined rules may be defined by a user rather than the user explicitly defining temperature criteria. In some embodiments, the criteria information 330 is received from another system. The temperature criteria can include one or more temperature thresholds and/or one or more temperature ranges. Pixels that meet the temperature criteria can be formatted for display differently than pixels that do not meet the temperature criteria. Pixels that meet one set of temperature conditions within the criteria can be formatted for display differently than pixels that meet another set of temperature conditions within the criteria.

Examples of temperature criteria can include a minimum temperature threshold. In this example, pixel intensity values corresponding to temperatures that exceed the minimum temperature threshold can be displayed using a different lookup table applied to the display-formatted pixels than pixels that have intensity values corresponding to temperatures that are less than or equal to the minimum temperature threshold. Similarly, examples of temperature criteria can include a maximum temperature threshold. In this example, pixel intensity values corresponding to temperatures that are less than the maximum temperature threshold can be displayed using a different lookup table applied to the display-formatted pixels than pixels that have intensity values corresponding to temperatures that are greater than or equal to the maximum temperature threshold. Similarly, examples of temperature criteria can include a targeted temperature value. In this example, pixel intensity values corresponding to temperatures that are substantially the same as the targeted temperature value (or within a small range of values around the targeted temperature value) can be displayed using a different lookup table applied to the display-formatted pixels than pixels that have intensity values corresponding to temperatures that are different from the targeted temperature value. In various implementations, a temperature value can be substantially the same as the targeted temperature value when the temperature value is within the temperature measurement accuracy of the thermal imaging system 300. Similarly, examples of temperature criteria can include a targeted temperature range. In this example, pixel intensity values corresponding to temperatures that are within the targeted temperature range can be displayed using a different lookup table applied to the display-formatted pixels than pixels that have intensity values corresponding to temperatures that are outside of the targeted temperature range. The temperature criteria can also include a combination of these example criteria. In such a configuration, a first lookup table can be used for pixels meeting a first criteria, a second lookup table can be used for pixels meeting a second criteria, and so on. Pixels that do not meet any criteria can be displayed using a default lookup table. In some embodiments, the lookup tables for pixels that meet the defined criteria can correspond to color lookup tables and the default lookup table can correspond to a grey-scale lookup table.

The thermography component 325 can be configured to convert the criteria information 330 into intensity-based criteria for analysis of the processed pixel intensity values 320. In some embodiments, the thermography component 325 can receive the processed pixel intensity values 320 and can generate an array of temperature values 340 corresponding to the processed pixel intensity values 320.

The thermal imaging system 300 can include criteria analysis component 335 configured to determine which pixels in the processed pixel intensity values 320 meet the one or more conditions in the criteria information 330. As described above, one or more conditions can be present in the criteria information 330 and the criteria analysis component 335 can be configured to determine which conditions, if any, are met for individual pixels. The criteria analysis component 335 can be configured to control selection, as described herein, of a lookup table to apply to individual pixels based on the outcome of the comparison of individual pixel intensity value to the one or more conditions.

In some embodiments, the criteria analysis component 335 can be configured to receive the array of temperature values 340 and compare individual temperature values to the criteria information 330 comprising one or more conditions. In such an embodiment, the criteria information 330 may skip the conversion from temperature to intensity as provided by the thermography component 325. In such an embodiment, the criteria analysis component 335 can be configured to control selection of a lookup table to apply to individual pixels based on the outcome of the comparison of individual pixel temperature values to the one or more conditions.

The thermal imaging system 300 includes the display processing component 345 configured to generate an array of display-formatted pixels 350. The display processing component 345 receives the processed pixel intensities 320 and performs histogram equalization processes on the pixel data. Examples of such processes are described herein with reference to FIG. 1A as well as in U.S. patent application Ser. No. 14/292,124, entitled "Data Digitization and Display for an Imaging System," filed May 30, 2014, the entire contents of which is incorporated by reference herein. In some embodiments, the array of processed pixel intensity values 320 can be adjusted using histogram equalization methods, for example, to represent each pixel with a value appropriate for a display of the thermal imaging system 300. In some embodiments, the thermal image sensor 305 outputs 14-bit digital words for each pixel and the display processing component 345 is configured to adjust individual pixel values so that each is represented using an 8-bit digital word. In such embodiments, the display-formatted pixels 350 comprise an array of 8-bit digital words.

A lookup table selection component 355 can receive the display-formatted pixels 350 and apply an appropriate lookup table based on the outcome of the criteria analysis component 335. In some embodiments, for an individual pixel, the criteria analysis component 335 can determine whether the individual pixel meets any of the criteria 330 and can provide that result to the lookup table selection component 355 so that it applies a suitable lookup table to the display-formatted pixel for display on the display 365.

The appropriate lookup table can be based at least in part on the criteria met, if any, by the individual pixel. For example, a pixel that met a first condition can be formatted for display by reference to a first lookup table (LUT 1) 357*a*. Similarly, a pixel that met a second condition can be formatted for display by reference to a second lookup table (LUT 2) 357*b*. Likewise, a pixel that did not meet any criteria can be formatted for display by reference to a third lookup table (LUT 3) 357*c*. Additional lookup tables may be present for selection in the lookup table selection component 355. In some embodiments, one or more lookup tables 357 may not be used when displaying a thermal image. In some embodiments, at least two different lookup tables are applied to different display-formatted pixels.

The lookup tables 357 can be configured to map a color value to a display-formatted pixel value. This mapping can be one-to-one. For example, where the display-formatted pixels are 8-bit digital words (corresponding to 256 different values per pixel), individual lookup tables 357 can have 256 entries that map an input digital word to a color value for display on the display 365 of the thermal imaging system 300.

The lookup tables 357 can be color lookup tables (e.g., a lookup table that maps display-formatted pixel values to one or more different colors) or a grey-scale lookup table (e.g., a lookup table that maps display-formatted pixel values to a grey-scale value). For example, a color lookup table can map input pixel values to color values that range from black to white with yellow and red colors assigned to intermediate values. A grey-scale lookup table can be configured to map input pixel values to different grey levels from black to white (or from white to black).

Using an individual pixel to illustrate the process, the pixel from the thermal image sensor 305 can be processed by the image processing electronics 315 to adjust its value. The pixel can then be analyzed to determine whether it meets any defined criteria 330. The pixel is then processed for display by the display processing component 345 which receives the pixel and adjusts its value using histogram equalization methods. An appropriate lookup table is applied to the display-formatted pixel value based on the result of the criteria analysis. For example, if the processed pixel intensity value meets the criteria 330, the color lookup table 357a can be applied to map the display-formatted pixel value to a color (e.g., orange).

Different color regimes in different lookup tables may be used in the lookup table selection component 355. For example, a red and yellow color regime may be used for criteria corresponding to higher temperatures and a blue and purple regime may be used for criteria corresponding to lower temperatures. Such a configuration may be implemented where there is a single criteria (e.g., a temperature threshold value) and the lookup table can be automatically selected depending on the single criteria. For example, if the temperature threshold value is below a configured temperature than a color lookup table using "cooler" colors (e.g., blues, purples, greens, etc.) can be used and a color lookup table using "warmer" colors (e.g., yellows, oranges, reds, etc.) can be used where the temperature threshold value is above the configured temperature. Such configurations may be implemented where there are multiple criteria and the lookup tables can be automatically assigned to different criteria depending on the temperatures or temperature ranges associated with the individual criteria. For example, where a first criteria corresponds to temperatures that are lower than temperatures associated with a second criteria, a color lookup table using "cooler" colors (e.g., blues, purples, greens, etc.) can be associated with the first criteria and a color lookup table using "warmer" colors (e.g., yellows, oranges, reds, etc.) can be used with the second criteria. In certain implementations, a user can assign individual criteria to individual lookup tables. The user may also be able to define color configurations for use.

In some embodiments, the display 365 receives temperature values 340 for display. The display 365 can be configured to display at least one temperature from the temperature values 340 overlaid on the thermal image. In certain embodiments, the at least one temperature is displayed in a position at or near the part of the imaged scene that is at that temperature.

Figure 4A:
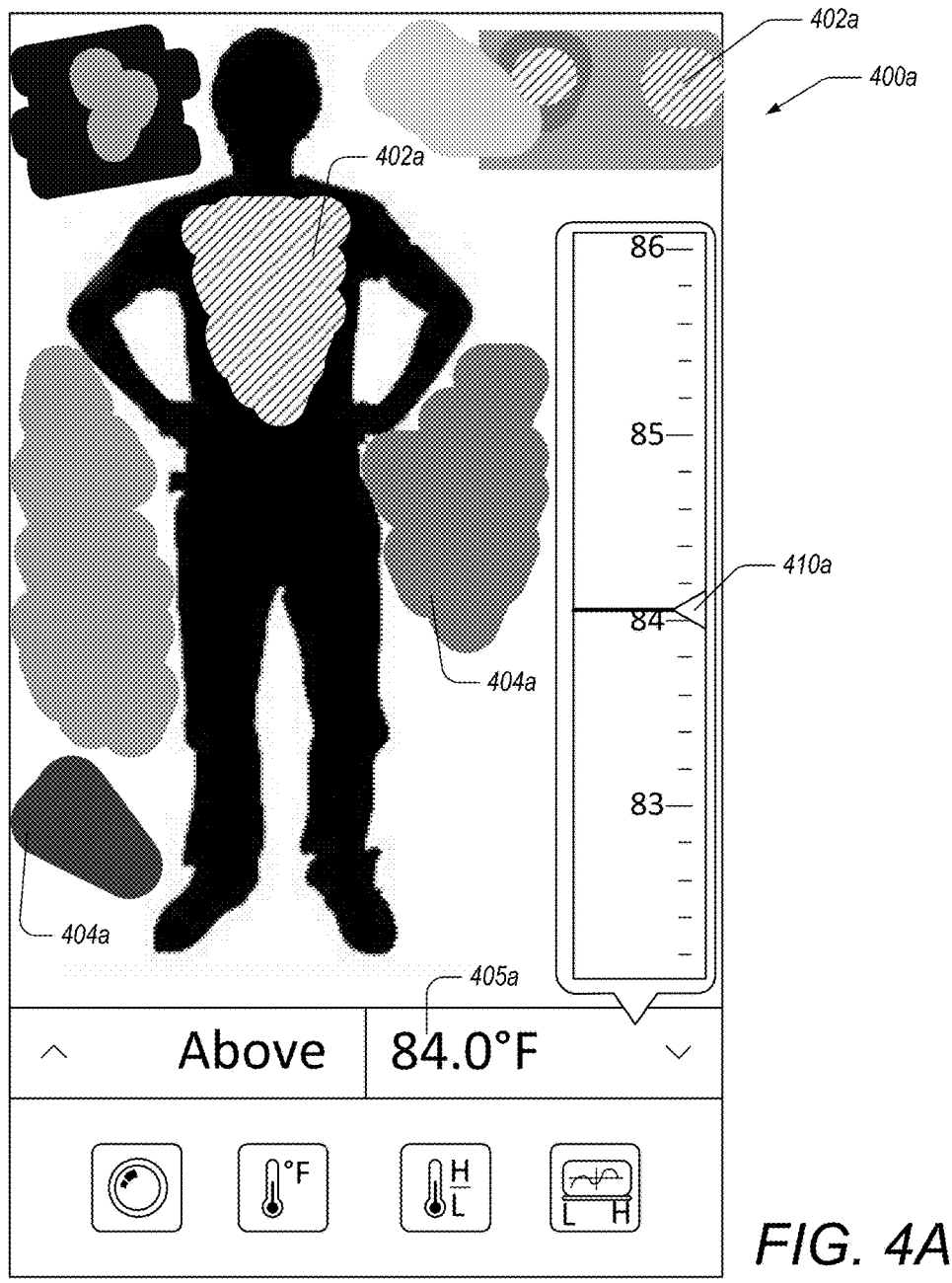
FIGS. 4A and 4B illustrate an example color display of a thermal image, the color portions of the displayed image corresponding to temperatures above a temperature threshold.
Figure 4B:
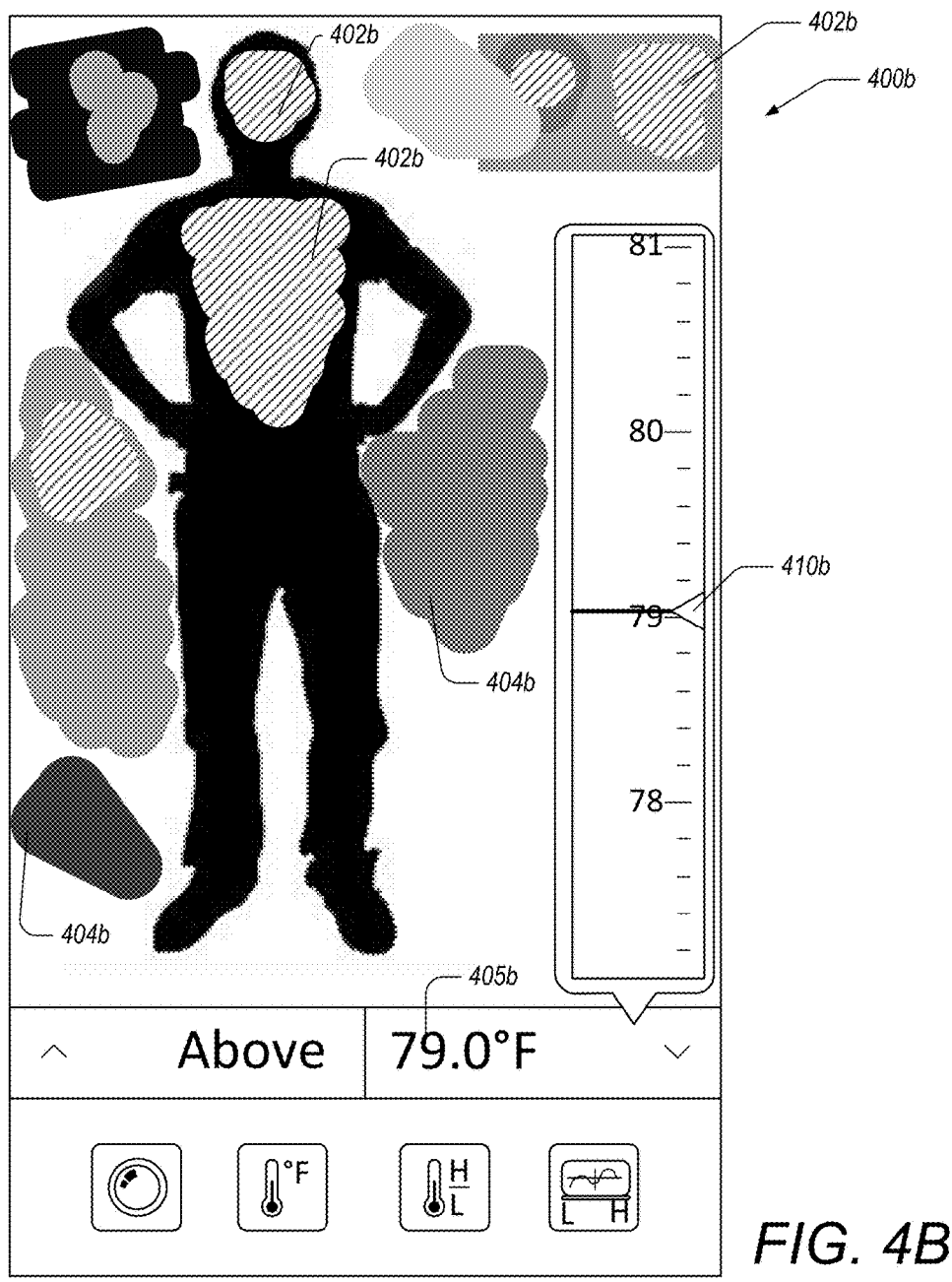

FIGS. 4A and 4B respectively illustrate example displayed thermal images 400a, 400b wherein the criteria correspond to a minimum temperature value. For example, FIG. 4A illustrates a displayed thermal image 400a wherein the criteria corresponds to a minimum temperature of 84° F. such that pixels corresponding to portions of the scene with temperatures greater than or equal to 84° F. are displayed using a color lookup table (colorized pixels 402a). FIG. 4B illustrates a displayed thermal image 400b wherein the criteria corresponds to a minimum temperature of 79° F. such that pixels corresponding to portions of the scene with temperatures greater than or equal to 79° F. are displayed using a color lookup table (colorized pixels 402b). For each displayed thermal image 400a, 400b, portions of the scene with a temperature below the respective temperature thresholds are displayed using a grey-scale lookup table (grey scale pixels 404a, 404b). Note that temperature of the person's hair in the scene falls between the two thresholds. For the displayed thermal images 400a, 400b, the display is on a touchscreen of a personal electronics device and the minimum temperature value 405a, 405b is set by a user through interaction with a touch-activated slider 410a, 410b.

Figure 5A:
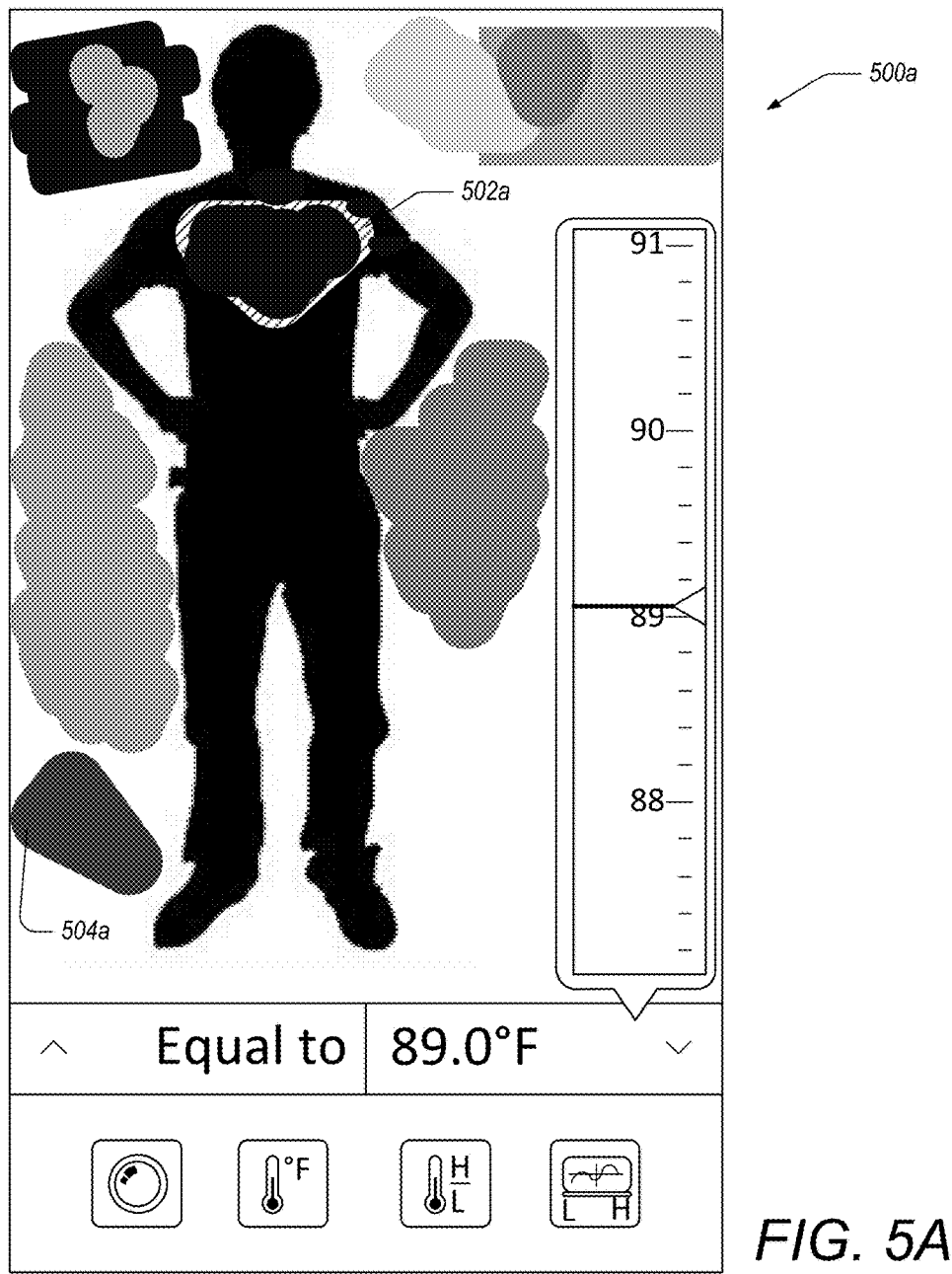
FIGS. 5A and 5B illustrate an example color display of a thermal image, the color portions of the displayed image corresponding to temperatures equal to a temperature value.
Figure 5B:
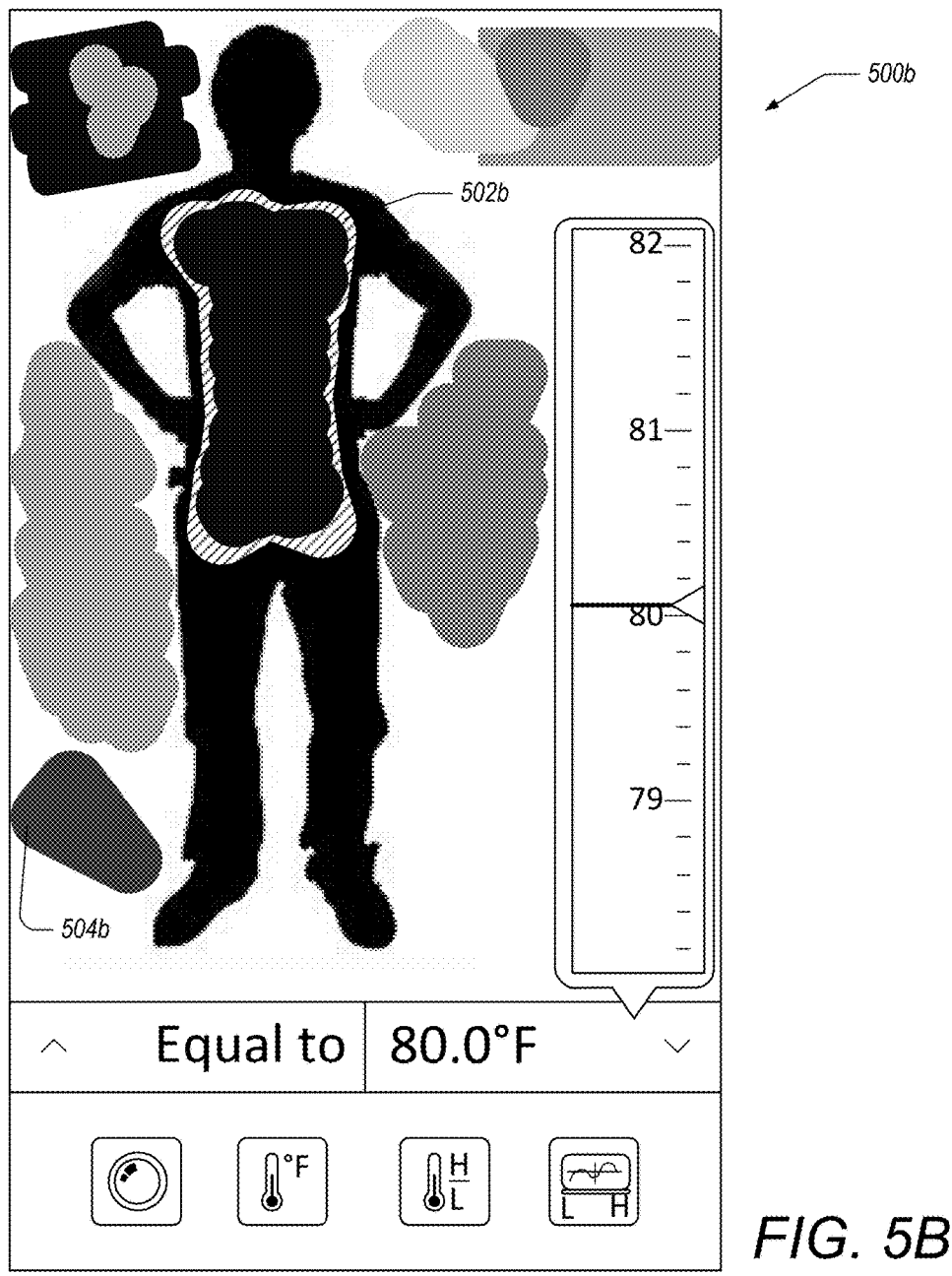

FIGS. 5A and 5B respectively illustrate example displayed thermal images 500a, 500b wherein the criteria correspond to a targeted temperature value. For example, FIG. 5A illustrates a displayed thermal image 500a wherein the criteria corresponds to a targeted temperature of 84° F. such that pixels within the accuracy of the thermal imaging system (e.g., about ±1° F.) of the targeted temperature value are displayed using a color lookup table (colorized pixels 502a). FIG. 4B illustrates a displayed thermal image 400b wherein the criteria corresponds to a targeted temperature of 79° F. such that pixels within the accuracy of the thermal imaging system (e.g., about ±1° F.) of the targeted temperature value are displayed using a color lookup table (colorized pixels 502b). For each displayed thermal image 500a, 500b, pixels corresponding to portions of the scene with a temperature different from the respective targeted temperature values are displayed using a grey-scale lookup table (grey scale pixels 504a, 504b). It should be noted that the accuracy of the thermal imaging system may differ for different implementations so that the range of temperatures considered to be equal to or substantially the same as the targeted temperature value can differ for these different implementations. For example, thermal imaging systems that are less accurate in determining temperature can be configured to determine that a larger range of temperatures are equal to the targeted temperature value than more accurate systems.

Example Method of Selective Color Display of a Thermal Image

Figure 6:
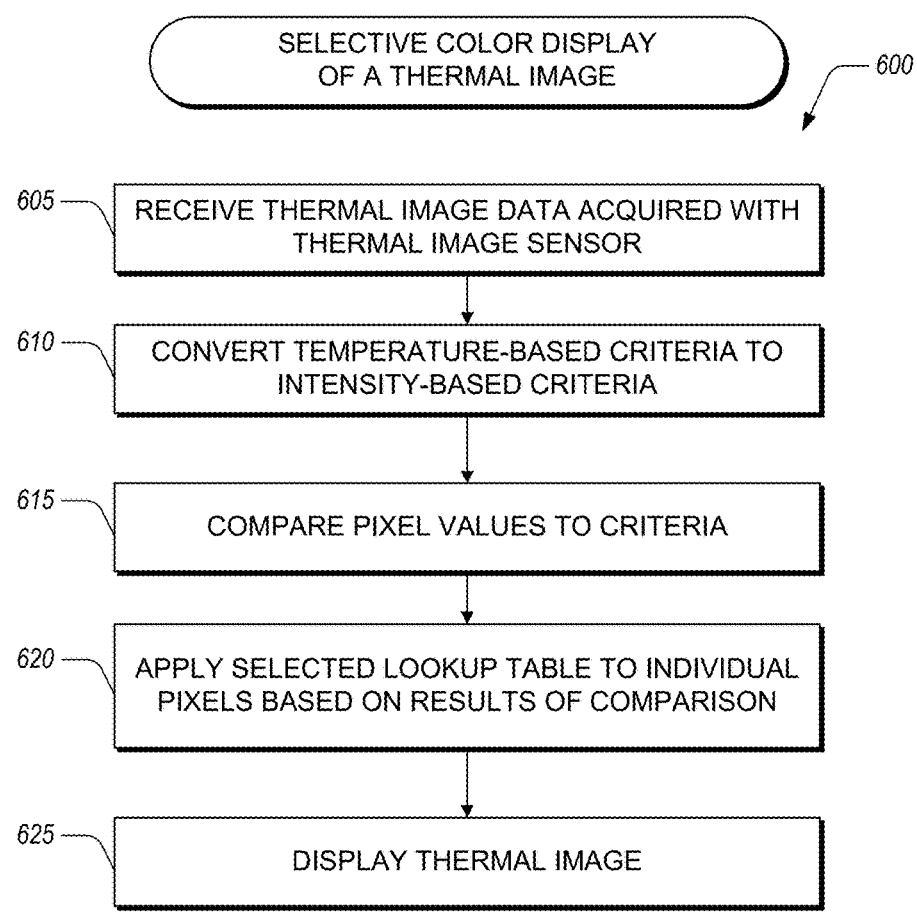
FIG. 6 illustrates an example method of selective color display for a thermal imaging system.

FIG. 6 illustrates an example method 600 of selective color display of a thermal image. The method 600 can be implemented using one or more hardware components in a thermal imaging system or image processing system. For ease of description, the method 600 will be described as being performed by the imaging system 100 described herein with reference to FIGS. 1A and 1B. However, one or more of the steps of the method 600 can be performed by any module, such as the display processing module 114, or combination of modules in the imaging system 100. Similarly, any individual step can be performed by a combination of modules in the imaging system 100. Likewise, the steps of the method can be performed by the thermal imaging system 300 described herein with reference to FIG. 3.

In block 605, the imaging system receives thermal image data acquired with a thermal image sensor. The imaging system can include the thermal image sensor or the imaging system can receive the thermal image data from another system (e.g., a thermal imaging camera or a data storage system). The thermal image data can include an array of pixel intensity values, the intensities of individual pixels corresponding to an intensity of infrared radiation detected by the pixel.

In block 610, the imaging system converts temperature-based criteria to intensity-based criteria. In some embodiments, the criteria can be received through user interaction with the imaging system. This can allow a user to determine desired temperature criteria for display formatting. In certain embodiments, the criteria can be provided from another system. This can allow another system to automatically determine temperature criteria and send the criteria with acquired thermal images to the imaging system. In various embodiments, the criteria can be automatically determined by the imaging system. This can allow the imaging system to analyze the thermal image data to automatically determine temperature criteria for display formatting. The temperature criteria can be converted to intensity-based criteria using a thermography function. The thermography function, for example, can be configured to convert from a temperature to an equivalent pixel intensity value.

In block 615, the imaging system compares pixel values to the temperature criteria. In certain implementations, the pixel values are intensity values (e.g., values corresponding to an intensity of infrared light at the pixel) that have been processed by the imaging system (e.g., by performing calibration procedures, applying non-uniformity corrections, applying filters, etc.). In such implementations, the comparison is accomplished by comparing individual pixel intensity values to the intensity-based criteria.

In various implementations, the pixel values are temperature values that have been determined using the thermography function. The temperature values can be determined after the pixel intensity values have been processed using any of the signal processing methods or modules described herein. In such implementations, the temperature criteria can remain as temperature-based values and the comparison can be between the converted temperature values of the pixels and the temperature-based values of the temperature criteria.

In block 620, the imaging system applies a lookup table to individual display-formatted pixels, the applied lookup table depending at least in part on the comparison of the pixel value to the temperature criteria. The imaging system can include a plurality of lookup tables. For pixels satisfying the temperature criteria, a first lookup table can be applied to the display-formatted pixels. In some embodiments, the first lookup table can be a color lookup table. For pixels that do not satisfy the temperature criteria, a second lookup table can be applied to the display-formatted pixels. In some embodiments, the second lookup table can be a grey-scale lookup table or a second color lookup table (e.g., a color table with colors that are different and/or distinct from the colors in the first lookup table). In some embodiments, the temperature criteria can include a plurality of conditions that can be independently satisfied. In such embodiments, individual lookup tables can be associated with particular conditions in the temperature criteria. Satisfaction of the particular conditions can mean that the imaging system applies the associated lookup table to the display-formatted pixels. In this way, multiple color lookup tables can be used simultaneously along with a grey-scale lookup table. This can advantageously provide a way for a user to readily identify pixels that satisfy individual conditions among a plurality of defined conditions.

The lookup tables can be configured to map display-formatted pixel values to color values. As described herein, the display-formatted pixel value can be a digital word. In certain implementations, the lookup tables can be configured to map a digital word (or array of digital words) to output color values.

In block 625, the imaging system displays a thermal image comprising the display-formatted pixels with the appropriate lookup tables applied. In some embodiments, at least a portion of the pixels are displayed using a grey-scale and another portion of the pixels are displayed in color. In this way, a user can relatively quickly and easily determine which pixels meet the defined criteria.

The embodiments described herein are exemplary. Modifications, rearrangements, substitute processes, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for displaying a thermal image using a thermal imaging system comprising an array of photodetectors configured to acquire thermal image data, the method comprising:
    acquiring thermal image data with the array of photodetectors, the thermal image data comprising an array of pixel intensity values;
    receiving temperature criteria;
    determining a scene temperature for individual pixel intensity values using a thermography function;
    comparing individual pixels to the temperature criteria;
    formatting for display individual pixel values;
    applying a first lookup table to an individual display-formatted pixel if the pixel value satisfies the temperature criteria and applying a second lookup table to the individual display-formatted pixel if the pixel value does not satisfy the temperature criteria; and
    displaying a thermal image on a display of the thermal imaging system, the thermal image comprising the display-formatted individual pixel values with the applied lookup tables.

2. The method of claim 1 further comprising converting the temperature criteria to intensity-based criteria using a thermography function.

3. The method of claim 2, wherein comparing individual pixels to the temperature criteria comprises comparing individual pixel intensity values to the intensity-based criteria.

4. The method of claim 1, wherein comparing individual pixels to the temperature criteria comprises comparing individual pixel temperature values to the temperature criteria.

5. The method of claim 1, wherein the first lookup table is configured to output a color value and the second lookup table is configured to output a grey-scale value, and wherein at least a portion of the thermal image is displayed using color and another portion of the thermal image is displayed using a grey scale.

6. The method of claim 1, wherein the temperature criteria comprises at least one of:
    a minimum temperature threshold that is satisfied if an individual pixel intensity value corresponds to a temperature that is greater than or equal to the minimum temperature threshold;
    a maximum temperature threshold that is satisfied if an individual pixel intensity value corresponds to a temperature that is less than or equal to the maximum temperature threshold;
    a targeted temperature value that is satisfied if an individual pixel intensity value corresponds to a temperature that is substantially the same as the targeted temperature value; and
    a targeted temperature range that is satisfied if an individual pixel intensity value corresponds to a temperature that is within the targeted temperature range.

7. The method of claim 1, wherein receiving the temperature criteria comprises determining the temperature criteria based on user interaction with the thermal imaging system.

8. The method of claim 1, wherein the temperature criteria includes a plurality of conditions.

9. The method of claim 8 further comprising applying a first color lookup table if the individual pixel value satisfies a first condition of the temperature criteria, applying a second color lookup table if the individual pixel value satisfies a second condition of the temperature criteria, and applying a grey-scale lookup table if the individual pixel value does not satisfy any of the plurality of conditions.

10. The method of claim 1 further comprising displaying at least one scene temperature overlaid on the thermal image.

11. The method of claim 1 further comprising performing signal processing on the thermal image data, the signal processing including performing a histogram equalization method on the pixel intensity values prior to applying the first or second lookup tables.

12. The method of claim 1 further comprising displaying a user interface with which a user may interact to set the temperature criteria.

13. A thermal imaging system comprising:
    an imaging array comprising an infrared focal plane array, the infrared focal plane array configured to generate signals corresponding to levels of infrared light incident on the infrared focal plane array;
    a detector circuit comprising readout electronics that receive the generated signals and output an array of pixel intensity values;

a system controller configured to:
receive temperature criteria;
determine a scene temperature for individual pixel intensity values using a thermography function;
compare individual pixels to the temperature criteria;
format for display individual pixel intensity values; and
apply a first lookup table to an individual display-formatted pixel if the individual pixel intensity value satisfies the intensity-based criteria and apply a second lookup table to the individual display-formatted pixel if the individual pixel intensity value does not satisfy the intensity-based criteria; and
a display configured to display a thermal image comprising an array of the display-formatted pixels with the applied lookup tables.

14. The thermal imaging system of claim 13, wherein the system controller is further configured to convert the temperature criteria to intensity-based criteria using the thermography function.

15. The thermal imaging system of claim 14, wherein the system controller is further configured to compare individual pixels to the temperature criteria by comparing individual pixel intensity values to the intensity-based criteria.

16. The thermal imaging system of claim 13, wherein the first lookup table comprises a color lookup table and the second lookup table comprises a grey-scale lookup table such that the thermal image comprises at least a first plurality of pixels displayed using color and a second plurality of pixels displayed using grey scale.

17. The thermal imaging system of claim 13, wherein the display comprises a touchscreen interface and the temperature criteria is received through user interaction with the touchscreen interface.

18. The thermal imaging system of claim 13 further comprising:
a thermal camera comprising a thermal camera housing and a connector wherein the imaging array and the detector circuit are within the thermal camera housing; and
a personal electronics device comprising the system controller and the display,
wherein the connector of the thermal camera is configured to mechanically and electrically couple to the personal electronics device to transmit the thermal image data from the thermal camera to the personal electronics device.

19. The thermal imaging system of claim 18, wherein, in use, control of the thermal camera is provided through interaction with the personal electronics device.

20. The thermal imaging system of claim 13, wherein the temperature criteria comprises at least one of:
a minimum temperature threshold that is satisfied if an individual pixel intensity value corresponds to a temperature that is greater than or equal to the minimum temperature threshold;
a maximum temperature threshold that is satisfied if an individual pixel intensity value corresponds to a temperature that is less than or equal to the maximum temperature threshold;
a targeted temperature value that is satisfied if an individual pixel intensity value corresponds to a temperature that is substantially the same as the targeted temperature value; and
a targeted temperature range that is satisfied if an individual pixel intensity value corresponds to a temperature that is within the targeted temperature range.

* * * * *